March 1, 1932.  C. M. WHEELER  1,847,505
POTATO PLANTING MACHINE
Filed Aug. 27, 1929  3 Sheets-Sheet 2
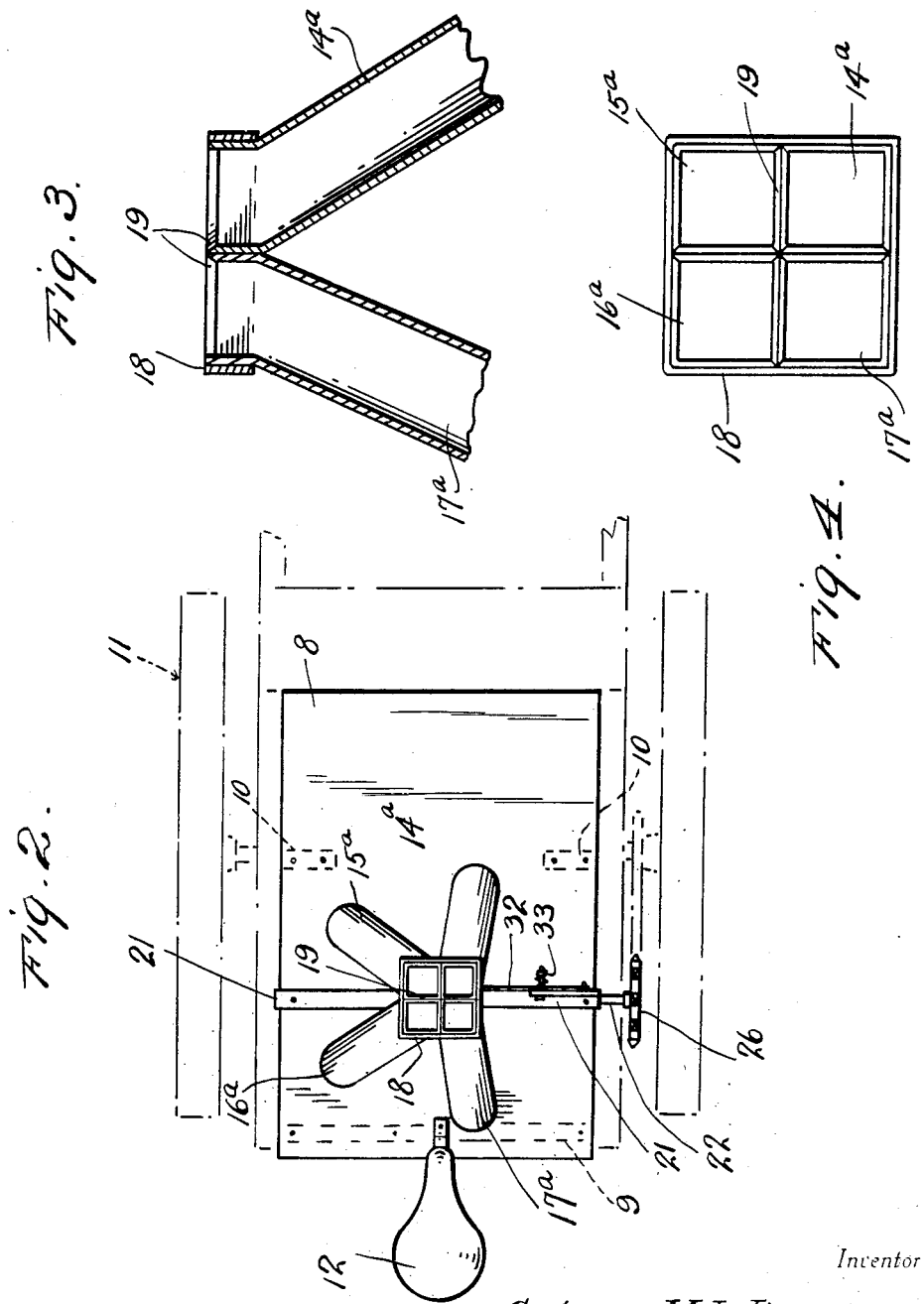
Inventor
Calvin M. Wheeler
By Clarence A. O'Brien
Attorney

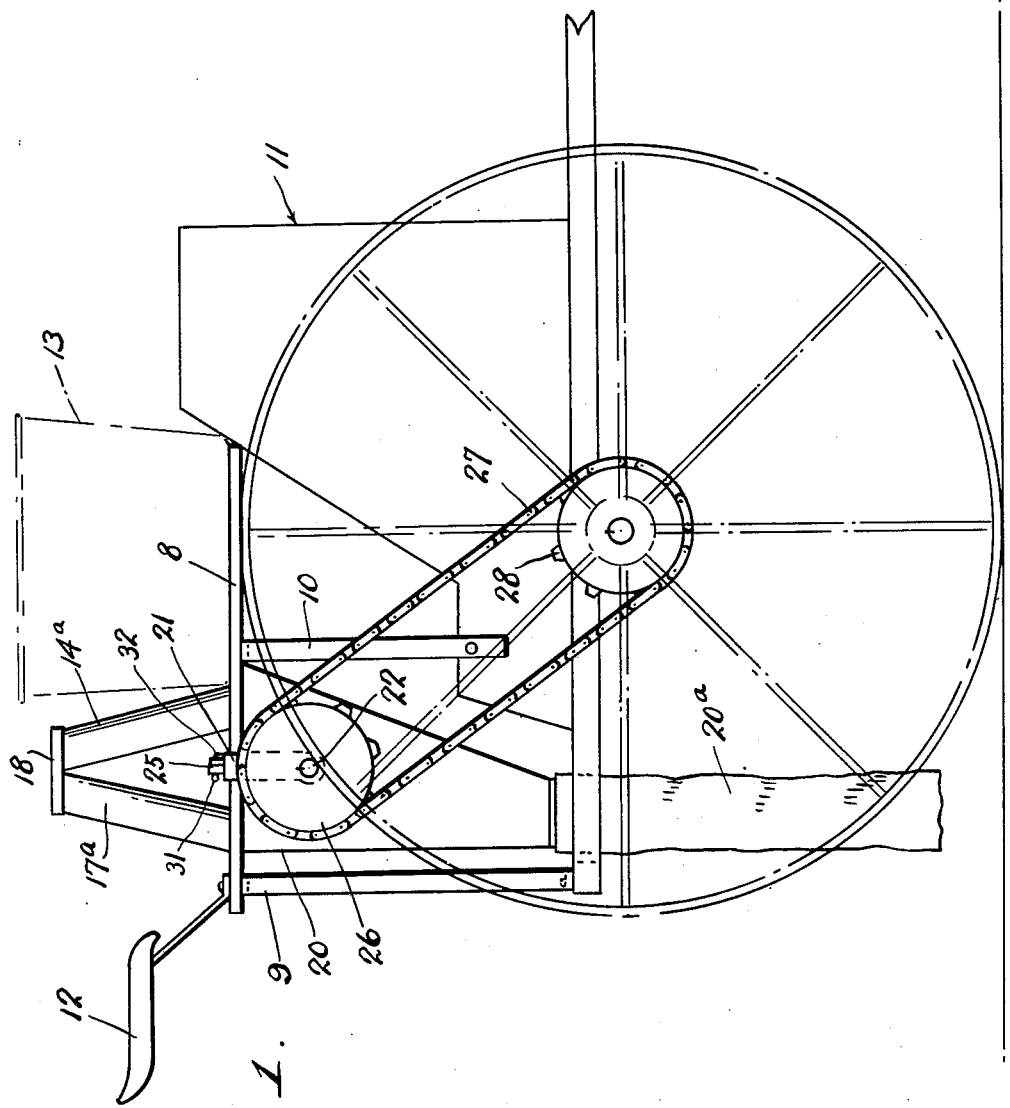

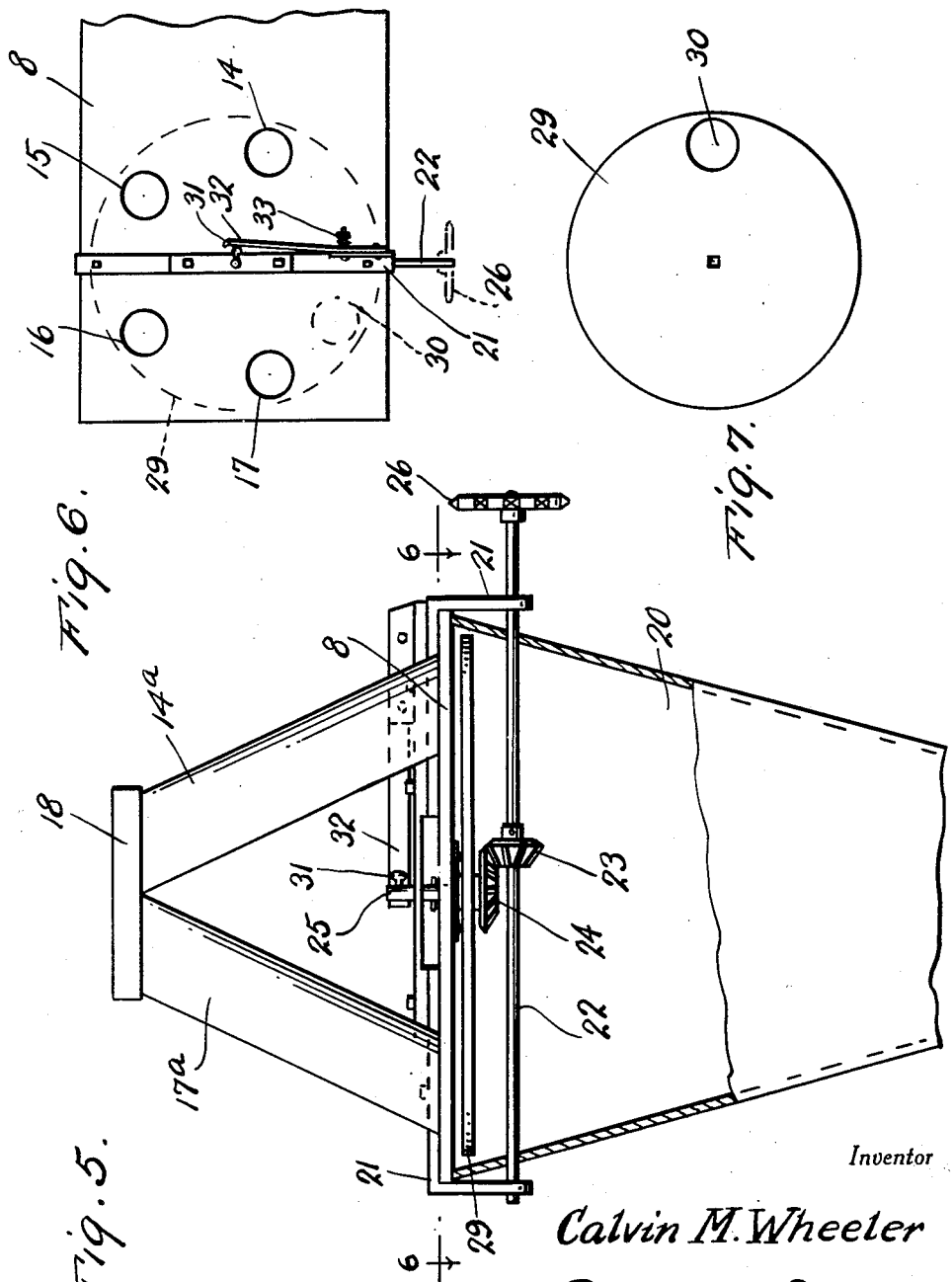

Patented Mar. 1, 1932

1,847,505

UNITED STATES PATENT OFFICE

CALVIN M. WHEELER, OF MARSLAND, NEBRASKA

POTATO PLANTING MACHINE

Application filed August 27, 1929. Serial No. 388,730.

This invention relates broadly to an improved potato planting machine and has more specific reference to what is hereinafter designated as a tuber unit, attachment for conventional types of planters.

The machine is designed to plant potatoes by the tuber unit method. The tuber unit method of planting utilizes the theory that all of the seed pieces from each potato shall be planted in the same row, one following another, and that a space shall exist between the respective groups, or some other means of identification placed between the distinguishable groups for identification purposes.
The machine as constructed will furnish a means of planting potatoes much more expeditiously and more accurately than any method known to me. The construction is comparatively light in weight, quite simple in arrangement and therefore economical. It decidedly reduces planting costs to the growers and the attachment is such as to render it capable of successful application and operation on various types of conventional potato planter machines.

Briefly stated, the attachment comprises a mounting plate, individual delivery tubes carried thereby, means on the upper ends of the tubes for severing the potato into a plurality of separate seed pieces, a hopper and discharge member connected therewith, and a machine driven valve or distributor arrangement for permitting the seed pieces to be deposited in proper timed and spaced relation, whereby to permit the tuber unit method of planting to be carried into effect in an efficient manner.

The specific details and their particular association and arrangement will become more readily apparent from the following description and drawings.

In the drawings:

Figure 1 is a side elevational view of a conventional planter equipped with an attachment constructed in accordance with the present invention.

Figure 2 is a top plan view of the structure seen in Figure 1.

Figure 3 is an enlarged fragmentary sectional view of the upper end portion of the delivery tube structure.

Figure 4 is a top plan view of the tube assembly and potato severing means.

Figure 5 is a rear elevational view with portions shown in section and elevation to impart an idea of the complete structural arrangement.

Figure 6 is a horizontal section taken approximately upon the plane of the line 6—6 of Figure 5.

Figure 7 is a top view of the rotary valve plate.

Referring now to Figure 1, it will be seen that the attachment comprises essentially a base plate of suitable configuration having attaching frames 9 and 10 for mounting it on the frame of the planter 11. The planter is of the usual wheel supported type and may be driven by a tractor, horses, or other suitable draft means. The reference character 12 merely designates a seat on the attachment for the operator of the planting means. Incidentally the operation of the machine requires an operator for the seat 12 and a driver for the tractor. The plate 8 is such in proportions and shape as to conveniently support a receptacle 13 containing the whole potato. This plate, as seen in Figure 6 is provided with a series of four or more individual discharge openings or holes designated respectively by the numerals 14, 15, 16, and 17.

Supported on the plate and rising therefrom in converging relation are individual tubes 14a, 15a, 16a and 17a. These come together at the top and are surrounded by a substantially rectangular frame 18. Moreover, the converging portions of the tubes are so made as to provide sharpened cutting edges 19. These tubes register with the openings 14 to 17 inclusive, in the order named.

Referring now to Figure 6, it will be seen that the plate is supported above the discharge hopper 19 and that the hopper has its discharge end connected with a depositing sleeve 20, which leads down to the ground. The reference character 21 designates a hanger having its down turned end formed with bearings to accommodate a rotatable shaft 22. A bevelled pinion 23 is on the intermediate portion of this shaft and meshes with a complemental gear 24, on the vertically disposed rotatably mounted stub shaft 25. On the other end of the shaft 22 is a sprocket 26, over which a chain 27 is trained. The chain is also trained over a sprocket 28 on the planter axle as seen in Figure 1. Hence, the power for operating the shaft 22 is received from the ground engaging wheel in a well known manner.

Again directing attention to Figure 5, it will be observed that the stub shaft 25 carries a valve disk 29, located in the upper end portion of the hopper and beneath the plate 8.

This is formed with an eccentric peripheral hole 30 which is adapted to successively register with the aforesaid openings 14 to 17 inclusive.

The upper end of the shaft 25 carries a cam projection 31, which engages with the free end portion of a resilient indicator strip 32. This strip is attached at one end to the hanger and cooperates with a retention spring 33, as shown better in Figure 6. These details cooperate in forming an audible indicator telling the operator when the four seed pieces of potato have been completely discharged from the delivery tubes 14a to 17a inclusive. Incidentally, this indicator arrangement is timed with respect to the valve plate, so that it comes into play about the time that the valve plate opening 30 is in the dotted line position shown in Figure 6. In other words, it comes into play just after the opening 30 has passed beyond the last delivery tube 17a.

In practice, the planting operator occupies the seat 12. He then takes the potato from the receptacle 13 and places it on top of the cutting ends of the delivery tubes 14a to 17a inclusive. He then takes the mallet and literally drives the potato down through the tube, causing it to be cut into four pieces of approximately equal size, in order that they will gravitate down to these tubes and into their respective holes 14 to 17 inclusive in the plate 8. However, these seed pieces cannot pass into the hopper until permitted to do so by registering of the opening 30 in the valve plate with one of the holes 14 to 17 inclusive.

Incidentally, instead of using a hammer for forcing and severing the potato, mechanical means might well be substituted, but the hand manipulated means has been found entirely satisfactory. As the machine travels along, the sprocket mechanism together with the gearing and shaft arrangement automatically actuates the valve 29, causing the openings 30 to register successively with the holes in the plate 8. Thus assuming that the valve hole 30 is in the dotted line position seen in Figure 6, it is obvious that as soon as the plate turns around in the direction from right to left and the opening 30 comes into registry with the opening 13, the potato seeds in the tube 14a will be discharged into the hopper and gravitate down through the hopper and the sleeve 30 into the ferrule in proper line. Then, as the valve disc travels on the opening 30 registers with the holes 15, 16 and 17, and so on. After the opening 30 has registered with the hole 17, the indicator means 32 comes into play, that is, the cam allows the free end portion of the strip 32 to snap over it and to give a metallic click against the stub shaft, telling the operator that all four of the potato pieces have been utilized in the planting operation. Thus, this enables him to keep this particular group of potato pieces separate from the next adjacent group and so on. This permits the proper fulfillment of the tuber unit method of planting to be carried into effect in an efficient manner.

A careful consideration of the description in connection with the drawings will enable the reader to obtain a clear understanding of the construction, operation, and features and advantages of the invention. Therefore, a more lengthy description is regarded as unnecessary.

Minor changes in the shape, size, rearrangement of details, materials, and so on, may be resorted within the scope of the adjoined claims, if desired.

I claim:

1. Means for planting potatoes with spaces separating the seed pieces of one potato from the seed pieces of other potatoes comprising a supporting plate having an annular row of holes therein, the first and last hole being spaced farther apart than the other holes, a depending discharge spout connected with the bottom of the plate and receiving the potato pieces dropped through all of the holes, a plurality of downwardly diverging tubes having their lower ends resting on the plate with each tube in communication with a hole, cutting means at the upper ends of the tubes for severing a potato into pieces with each piece dropping into a tube, a disk rotatably supported under the plate and having a single opening therein for registering with the openings in the plate during the rotation of the disk and means for rotating the disk.

2. Means for planting potatoes with spaces separating the seed pieces of one potato from the seed pieces of another potato comprising a supporting plate having an annular row of holes therein, the first and last hole being spaced farther apart than the other holes, a depending discharge spout connected with the bottom of the plate receiving the potato piece dropped from all of the holes, a plurality of downwardly diverging tubes having their lower ends resting on the plate with each tube in communication with a hole, cutting means at the upper ends of the tubes for severing a potato into pieces with each piece dropping into a tube, a disk rotatably supported under the plate and having a single opening therein for registering with the openings in the plate during the rotation of the disk and means for rotating the disk, and signal means actuated by the disk operating means as the opening in the disk is passing from the last hole in the plate to the first one.

In testimony whereof I affix my signature.

CALVIN M. WHEELER.